United States Patent
Kono et al.

(10) Patent No.: US 8,277,895 B2
(45) Date of Patent: Oct. 2, 2012

(54) METHOD FOR MANUFACTURING CERAMIC HONEYCOMB STRUCTURE AND COATING MATERIAL FOR THE CERAMIC HONEYCOMB STRUCTURE

(75) Inventors: Ryuta Kono, Nagoya (JP); Yoshiro Ono, Nagoya (JP); Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 345 days.

(21) Appl. No.: 12/613,900

(22) Filed: Nov. 6, 2009

(65) Prior Publication Data

US 2010/0119719 A1    May 13, 2010

(30) Foreign Application Priority Data

Nov. 10, 2008 (JP) .................. 2008-287857
Oct. 27, 2009 (JP) .................. 2009-246412

(51) Int. Cl.
   *B05D 3/02* (2006.01)
(52) U.S. Cl. .................. 427/372.2; 427/397.7
(58) Field of Classification Search .................. None
   See application file for complete search history.

(56) References Cited

U.S. PATENT DOCUMENTS

| | | | |
|---|---|---|---|
| 5,188,779 A | 2/1993 | Horikawa et al. | |
| 5,629,067 A | 5/1997 | Kotani et al. | |
| 5,634,952 A * | 6/1997 | Kasai et al. | 55/302 |
| 2006/0121240 A1 | 6/2006 | Hirai et al. | |
| 2007/0202036 A1 * | 8/2007 | Jongen et al. | 423/593.1 |
| 2007/0234694 A1 * | 10/2007 | Miyairi et al. | 55/523 |
| 2010/0135866 A1 * | 6/2010 | Mizuno et al. | 422/180 |

FOREIGN PATENT DOCUMENTS

| | | |
|---|---|---|
| CN | 1735575 A | 2/2006 |
| JP | A-5-269388 | 10/1993 |
| JP | B2-2604876 | 4/1997 |
| JP | A-2004-231506 | 8/2004 |

OTHER PUBLICATIONS

Jun. 20, 2012 Office Action issued in Chinese Application No. 200910174429.1 with English-language Translation.

* cited by examiner

*Primary Examiner* — Erma Cameron
(74) *Attorney, Agent, or Firm* — Oliff & Berridge, PLC

(57) ABSTRACT

There is provided a method for manufacturing a ceramic honeycomb structure comprising: a coating material adjustment step for obtaining a coating material by mixing at least water with a ceramic powder aggregate having only one peak in a particle size distribution, an average particle size of 23 to 39 µm, and a particle size distribution width of 15 to 33, a coating material application step for applying the coating material to cover the outer periphery of a honeycomb structure having a plurality of cells separated by porous ceramic partition walls, and a coating material heat-drying step for forming an outer wall by heat-drying the coating material after the coating material application step. By the method, the outer periphery is covered with a coating material to form an outer wall to hardly generate, for example, crack generation and peeling upon drying the outer wall, and the coating material is provided.

1 Claim, 13 Drawing Sheets

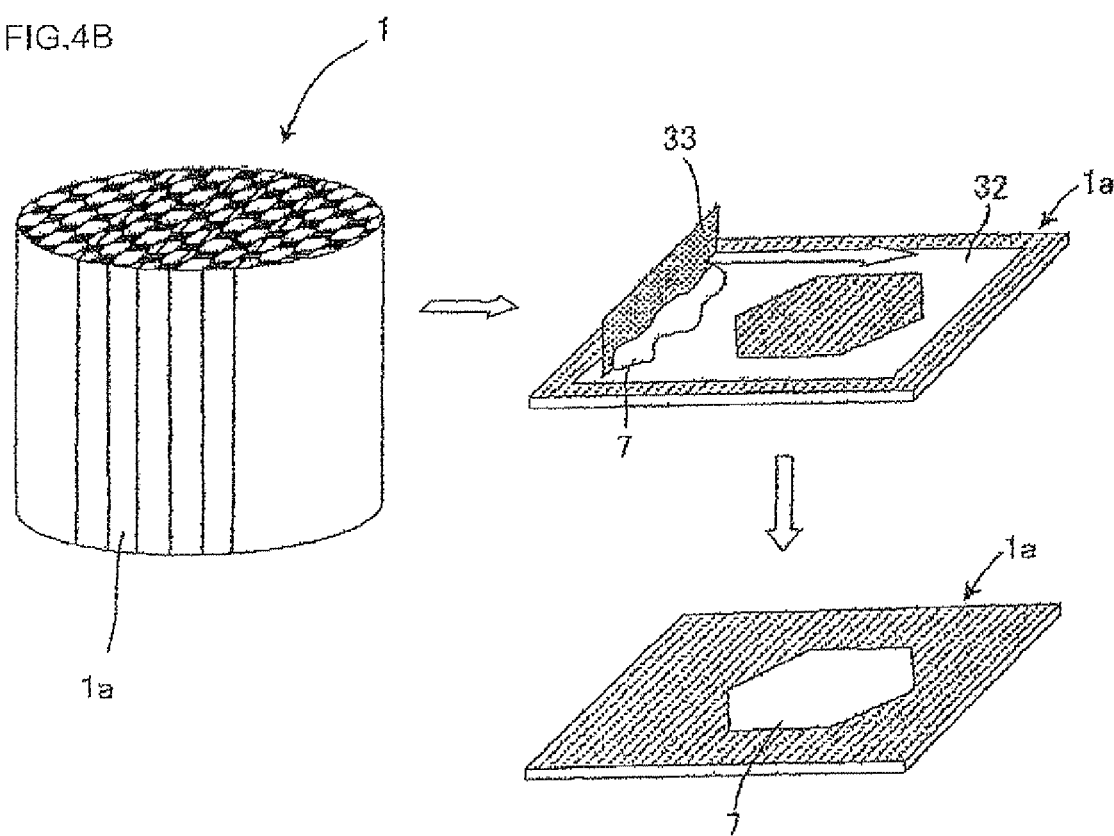

State of crack generation

Example 1

Example 6

Comparative Example 1

Comparative Example 10

METHOD FOR MANUFACTURING CERAMIC HONEYCOMB STRUCTURE AND COATING MATERIAL FOR THE CERAMIC HONEYCOMB STRUCTURE

BACKGROUND OF THE INVENTION AND RELATED ART STATEMENT

The present invention relates to a method for manufacturing a ceramic honeycomb structure relating to formation of the outer wall of the ceramic honeycomb structure and a coating material used for the method.

There is used a honeycomb structure made of heat resistant ceramic as a substrate for loading a catalyst for purifying harmful substances such as nitrogen oxides (NOx) and carbon monoxide (CO) in exhaust gas from automobiles or a filter for trapping particulate matter in exhaust gas thereon. The ceramic honeycomb structure has small mechanical strength since partition walls are thin and has high porosity. For the purpose of compensating for the strength and inhibiting breakages, there is provided an outer wall by applying slurry containing a ceramic powder (hereinbelow referred to as a "coating material") on the outer periphery of a honeycomb structure (cell structure) subjected to grinding to have a fixed diameter, followed by drying and firing (see, e.g., JP-A-5-269388 and JP-B-2604876).

When a coating material is applied on the outer periphery of a honeycomb structure and dried, a crack is caused due to a contraction difference between the surface and the inside of the coating material. The crack in the outer wall, leads to deterioration in strength of the ceramic honeycomb structure, and, when a catalyst is loaded on the outer wall, it causes leakage of a catalyst solution from the crack. Therefore, in a coating material-drying step, observation on crack generation or the like in the coating material is performed, and amendment operation (reapplication) is manually performed with spending 45 seconds for one.

In addition, since a crack is caused due to a contraction difference between the surface and the inside of the coating material when the coating material is applied and dried, there has been provided a coating material where the contraction difference is suppressed by the use of a ceramic powder having a tap bulk density of 1.3 g/cm$^3$ or more to hardly cause a crack in the outer wall (see e.g., JP-A-2004-231506).

In addition, in JP-A-2004-231506, the average particle size of the ceramic powder is adjusted, and the rate of the powder component having a particle diameter of 44 μm or less is adjusted to 80 wt % or less. By forming a dense layer in the vicinity of the ceramic honeycomb structure of the coating layer, water movement to the structure is limited, and a difference in contraction of the coating layer is suppressed to inhibit crack generation. However, a particle site distribution of the ceramic powder is not adjusted, and, when heat-drying is performed after the application, a crack cannot be inhibited completely.

Heretofore, when natural drying which hardly causes a crack was performed at ordinary temperature (25° C., 50% RH), drying of coating material required 24 hours or more. Further, since it was necessary to secure a space for drying, it was necessary to finish in a short period of time by heat-drying. Reduction in drying time and abolition of the amendment operation are preferable for improvement of takt time.

In addition, a jet mill used for pulverizing a aggregate has a defect that adjustment of both the particle size and the particle size distribution is difficult because the jet mil tends to make the particle size distribution broader (wider) as the particle size is increased because variance in the particle size increases and to make the particle size distribution sharper (narrower) as the particle size is decreased because particle size is uniformalized.

For example, as a ceramic powder (coarse particle aggregate) having a relatively large average particle size, a ceramic powder having an average particle size of 31 μm is prepared by the use of a mass production pulverizer. In the same manner, a ceramic powder having an average particle size of 16 μm (fine particle aggregate), which has about half the size of the coarse particle aggregate, is prepared. From the comparison, a particle size distribution of the ceramic powder having an average particle size of 31 μm becomes broad. FIG. 3A is a schematic view showing a coating material using a ceramic powder (coarse particle aggregate 42) having a relatively large average particle size. Since the average particle size is large though the particle size distribution is broad, the amount of liquid components 43 such as water is large. Therefore, since drying contraction is large in the case that the liquid components 43 such as water evaporate depending on drying conditions, a crack is caused. Thus, it has been difficult to prepare a ceramic powder for coating material, which hardly causes a crack upon drying, by the use of a mass production pulverizer.

SUMMARY OF THE INVENTION

The present invention aims to provide a method for manufacturing a honeycomb structure where the outer wall is formed with covering the outer periphery with a coating material and where a defect such as crack generation or peeling is hardly caused in the outer wall upon drying the coating material and the coating material.

The present inventor developed a coating material where a particle size distribution of a ceramic powder aggregate used in the coating material is adjusted to have a fixed width in order to inhibit crack generation by suppressing a difference in contraction upon drying the coating material and found out that the aforementioned problems can be solved by the coating material. That is, according to the present invention, the following method for manufacturing a honeycomb structure is provided.

[1] A method for manufacturing a ceramic honeycomb structure having a plurality of cells separated by porous ceramic partition walls, the honeycomb structure being covered by a coating material, and the method comprising: a coating material adjustment step for obtaining a coating material by mixing at least water with a ceramic powder aggregate having only one peak in a particle size distribution curve, an average particle size of 23 to 39 μm, and a particle size distribution width of 15 to 33 in the case that the particle size distribution width is defined as a value obtained by dividing half-value width of peak height in a particle size distribution curve obtained by plotting particle size-based frequency by the peak height; a coating material application step for applying the coating material to cover the outer periphery of a honeycomb structure having a plurality of cells separated by porous ceramic partition walls; and a coating material heat-drying step for forming an outer wall by heat-drying the coating material after the coating material application step.

[2] A coating material for a ceramic honeycomb structure having a plurality of cells separated by porous ceramic partition walls, the coating material containing at least water and a ceramic powder aggregate having only one peak in a particle size distribution curve, an average particle size of 23 to 39 μm, and a particle size distribution width of 15 to 33 in the case that the particle size distribution width of a powder is defined as a value obtained by dividing half-value width of peak height in a particle size distribution curve obtained by plotting particle size-based frequency by the peak height.

By applying the present invention, an operation performed manually for amending the ceramic honeycomb structure having a crack caused upon drying the coating material can be omitted, and a crack and peeling caused in the coating material can be inhibited.

BRIEF DESCRIPTION OF THE DRAWINGS

FIG. 4B is a view for explaining a method for manufacturing a sample for performing crack observation.

REFERENCE NUMERALS

1: honeycomb structure, 1a: plate-shaped article, 2: cell structure, 3: outer wall, 4: cell, 5: partition wall, 7: coating material, 10: honeycomb structure, 12: cell structure, 14: cell, 15: partition wall, 17: outer peripheral wall, 18: bonding layer, 22: honeycomb segment, 31: metal petri dish, 32: mold, 33: squeegee, 35: holding jig, 36: flat nozzle, 37: coating material supply path, 41: fine particle aggregate, 42: coarse particle aggregate, 43: liquid component, 50: counter type jet mill, 51: raw material powder supply port, 52: pulverization nozzle, 53: classification rotor, 54: powder discharge port, 60: horizontal swirling flow type jet mill, 61: pusher nozzle, 62: Venturi nozzle, 63: grinding nozzle, 64: pulverization zone, 65: classification zone, 66: mill frame, 67: ceramic liner, 68: outlet

DETAILED DESCRIPTION OF THE INVENTION

Hereinbelow, an embodiment of the present invention will be described with referring to drawings. The present invention is by no means limited to the following embodiment, and changes, modifications, and improvement may be made as long as they do not deviate from the scope of the invention.

Figure 1A:
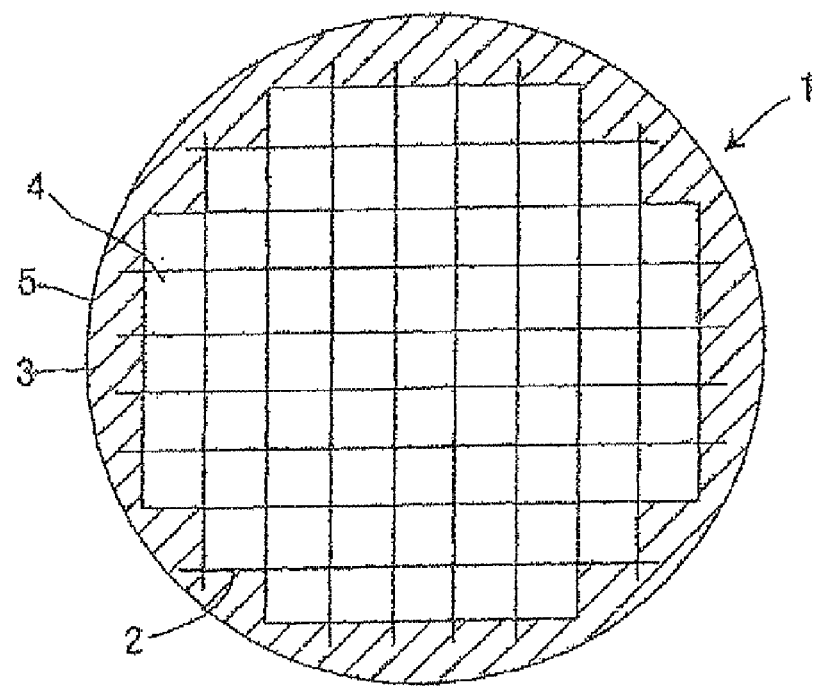
FIG. 1A is a cross-sectional view cut along a plane perpendicular to the central axis of the honeycomb structure.
Figure 1B:
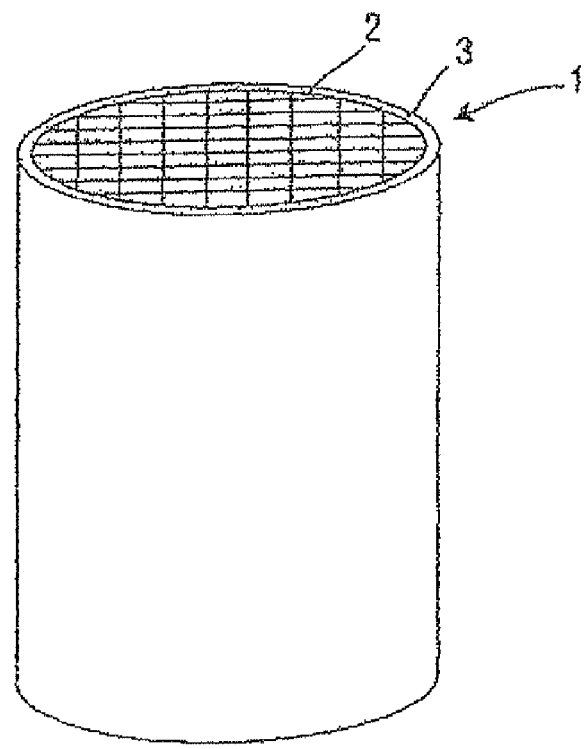
FIG. 1B is a perspective view showing a honeycomb structure.

As shown in FIGS. 1A and 1B, the honeycomb structure 1 manufactured by the manufacturing method of the present invention is provided with a cell structure 2 having a plurality of cells 4 functioning as fluid passages by being separated by very thin partition walls 5 made of porous body having a large number of pores and formed into a honeycomb shape and an outer wall 3 formed so as to cover the outer periphery of the cell structure 2.

A method for manufacturing a ceramic honeycomb structure of the present intention is a method including a coating material adjustment step for obtaining a coating material by mixing at least water with a ceramic powder aggregate having only one peak in a particle size distribution curve, an average particle size of 23 to 39 μm, and a particle size distribution width of 15 to 33 in the case that the particle size distribution width of a powder is defined as a value obtained by dividing half-value width of peak height in a particle size distribution curve obtained by plotting particle size-based frequency (%) by the peak height; a coating material application step for applying the coating material to cover the outer periphery of a honeycomb structure having a plurality of cells 4 separated by porous ceramic partition walls 5; and a coating material heat-drying step for forming an outer wall 3 by heat-drying the coating material after the coating material application step.

Figure 10:
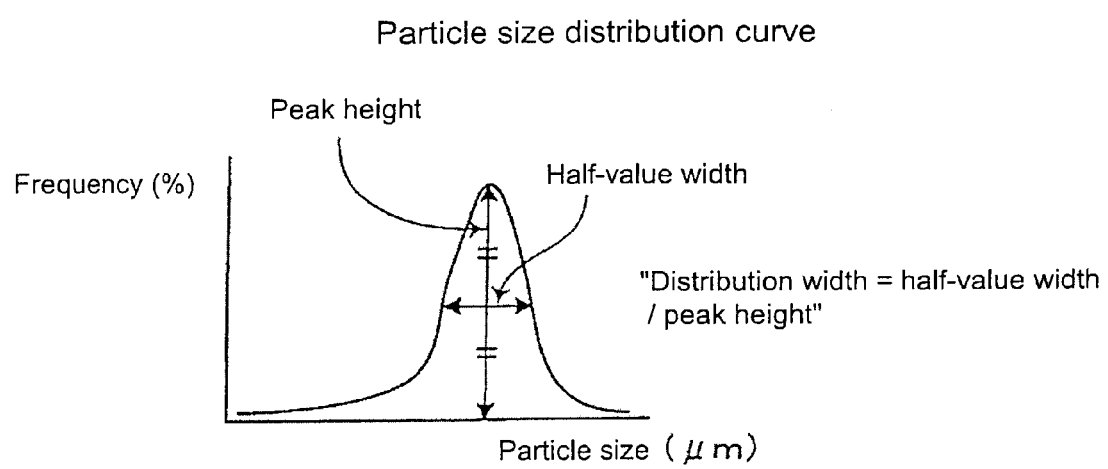
FIG. 10 is a graph for explaining a definition of particle size distribution width.

The particle size distribution will be described in detail with referring to the particle size distribution curve in FIG. 10. FIG. 10 shows a particle size distribution curve, where the horizontal axis of the logarithmic scale shows particle sizes (μm) of a ceramic powder aggregate, and the vertical axis shows frequencies (%) of the ceramic powder aggregate. In the present invention, the point where the frequency (%) is the highest in the particle size distribution curve is determined as a "peak". In addition, in the case that the number of peak, which is highest, is one, it is expressed by the phrase that "the peak is one". When the number of peak is one, the particle size distribution width is defined as a value obtained by dividing half-value width of peak height, that is, width along the horizontal axis of the particle size distribution curve at the height which is half the peak height by the peak height. That is, (Particle size distribution width)=(Half-value width)/(Peak height).

Figure 3A:
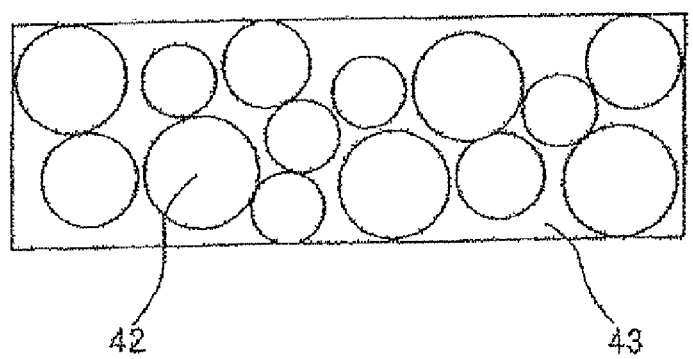
FIG. 3A is a schematic view showing a coating material using a ceramic powder having a large average particle size and a sharp particle size distribution.
Figure 3B:
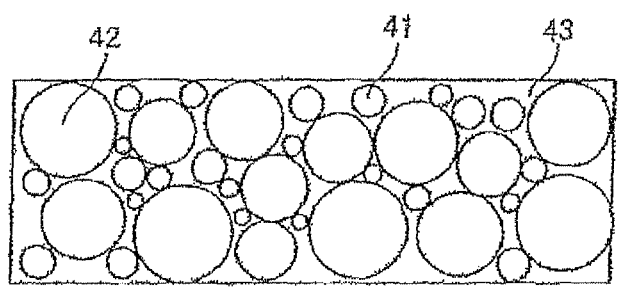
FIG. 3B is a schematic view showing a coating material using a mixed aggregate obtained by mixing a coarse particle aggregate having a large average particle size and a fine particle aggregate having a small average particle size and having a broad particle size distribution.

In a method for manufacturing a honeycomb ceramic structure of the present invention, it is preferable that, in the coating material adjustment step, a mixed aggregate is obtained by mixing a fine particle aggregate and a coarse particle aggregate having a larger average particle size than that of the fine particle aggregate to use the mixed aggregate as the ceramic powder aggregate. Here, in the coating material adjustment step, it is further preferable to use a mixed aggregate as a ceramic powder aggregate, wherein the mixed aggregate is obtained by mixing a fine particle aggregate and a coarse particle aggregate having an average particle size 20 to 31 μm larger than that of the fine particle aggregate. FIG. 3B is a schematic view showing a coating material using a ceramic powder obtained by mixing a coarse ceramic powder (coarse particle aggregate) having a large average particle size and a fine ceramic powder (fine particle aggregate) having a small average particle size and having a broad particle size distribution. As shown in FIG. 3B, since the distribution is made so as to be able to fill the fine particle aggregate 41 and the coarse particle aggregate 42 alternately, the amount of liquid components 43 such as water is small, and flowability and applicability of the coating material is sufficiently secured.

In addition, in a method for manufacturing a ceramic honeycomb structure of the present invention, it is further preferable that, in a coating material adjustment step, the fine particle aggregate having an average particle size of 16 to 20 μm and a particle size distribution width of 5 to 11 is mixed with the coarse particle aggregate having an average particle size of 40 to 47 μm and a particle size distribution width of 11 to 13 to obtain the mixed aggregate for the use as the ceramic powder aggregate.

In a coating material adjustment step of the present invention, the coating material contains at least a ceramic powder aggregate and water and, therefore, is slurried. As the ceramic powder aggregate the same material as the material used for the honeycomb structure 1 and honeycomb segment 22 described below can be used. In addition, the coating material may contain a bonding material such as colloidal silica, ceramic fibers, an inorganic additive, an organic additive, an inorganic powder, foaming particles, a surfactant, and the like.

The coating material for a ceramic honeycomb structure of the present invention contains at least a ceramic powder aggregate having only one peak in a particle size distribution curve, an average particle size of 23 to 39 μm, and a particle size distribution width of 15 to 33 in the case that the particle size distribution width of a powder is defined as a value obtained by dividing half-value width of peak height in a particle size distribution curve obtained by plotting particle size-based frequency by the peak height and water. Here, it is preferable to use a mixed aggregate as the ceramic powder aggregate for the coating material, wherein the ceramic powder aggregate is a mixed aggregate of a fine particle aggregate and a coarse particle aggregate having an average particle size 20 to 31 μm larger than that of the fine particle aggregate.

In the case of pulverizing a ceramic powder aggregate by the use of a jet mill, it is easy to prepare a powder having a uniform particle diameter and a sharp particle size distribution in either fine particles or coarse particles. However, it has generally been difficult to make the particle size distribution broad. In order to obtain a powder aggregate having such a broad particle size distribution obtained by a single grinding, it is preferable to increase supply amount (kg/hr) of a raw material powder before pulverization and to shorten the pulverization time. At that time, it is preferable to use a horizontal swirling flow type jet mill to obtain a powder aggregate. It is preferable that the supply amount (kg/hr) of the raw material powder before pulverization to be put in the mill is two to six times, more preferably three to five times the amount and that the pulverization time is 0.1 to 0.6 times, more preferably 0.2 to 0.4 times the pulverization time in the case of obtaining a fine aggregate having a uniform particle size and a sharp particle size distribution in comparison with the case of obtaining a fine particle aggregate having a uniform size and a sharp particle size distribution.

In addition, in the coating material for a ceramic honeycomb structure of the present invention, the ceramic powder aggregate is preferably a mixed aggregate obtained by mixing a fine particle aggregate and a coarse particle aggregate having a larger average particle size than that of the fine particle aggregate. In order to obtain such a mixed aggregate, for example, it is preferable that the fine particle aggregate and the coarse particle aggregate are manufactured by pulverizing a powder aggregate by the use of a ceramic jet mill having a classification function, followed by mixing these aggregates together at a blend ratio where desired average particle size and particle size distribution width are obtained to give a mixed aggregate. By thus manufacturing a fine aggregate and a coarse aggregate, followed by mixing them to give a mixed aggregate, there can be obtained a coating material having higher precision in average particle size and particle size distribution width. Therefore, it greatly contributes to improvement in productivity in a coating material adjustment step. The blend ratio (mass ratio) of the fine particle aggregate and the coarse particle aggregate is within the range of preferably "fine particle aggregate:coarse particle aggregate=2:8 to 5:5", particularly preferably "fine particle aggregate: coarse particle aggregate=3:7 to 4:6".

In addition, in the coating material for a ceramic honeycomb structure of the present invention, it is further preferable that the aforementioned fine particle aggregate has an average particle size of 16 to 20 μm and a particle size distribution width of 5 to 11 and that the aforementioned coarse particle aggregate has an average particle size of 40 to 47 μm and a particle size distribution width of 11 to 13.

Figure 2A:
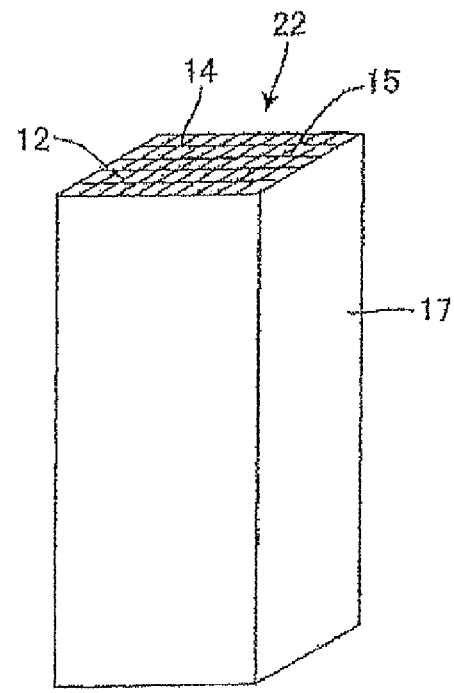
FIG. 2A is a perspective view showing a honeycomb segment.
Figure 2B:
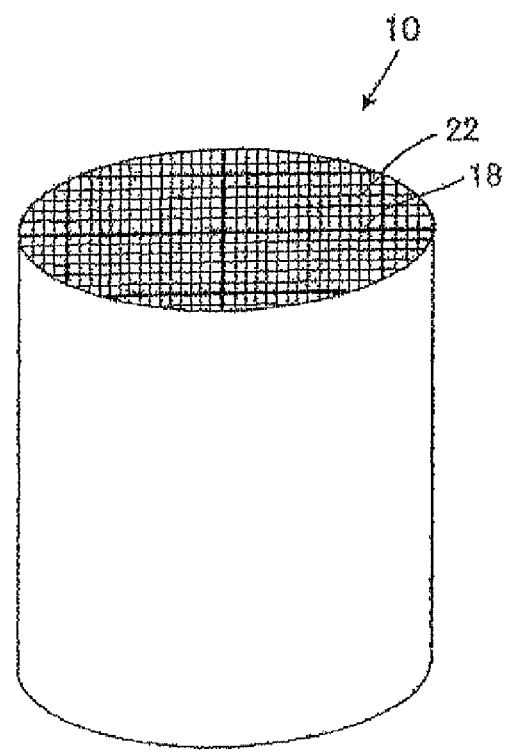
FIG. 2B is a perspective view showing a honeycomb structure obtained by bonding honeycomb segments.

A ceramic honeycomb structure where a manufacturing method of the present invention can be applied may be a honeycomb structure 10 obtained by unitarily bonding a plurality of honeycomb segments 22 with a bonding material as shown in FIGS. 2A and 2B besides the monolithic honeycomb structure 1 described by the use of FIGS. 1A and 1B. The honeycomb structure 10 is obtained by unitarily bonding a plurality of honeycomb segment 22 each provided with a cell structure 12 having a plurality of cells 14 separated by porous partition walls 15 and functioning as fluid passages and a porous outer peripheral wall 17 disposed in the outer periphery of the cell structure 12 with a bonding material at outer peripheral walls 17 of the cell structures 12. The bonding material is dried to form a bonding layer 18 on the outer peripheral wall 17, and outer peripheral walls 17 are bonded together by means of the bonding layer 18.

As a material used for the honeycomb structure 1 or the honeycomb segment 22, there can be used one kind of material selected from the group consisting of cordierite, mullite, alumina, spinel, silicon carbide, metal silicon, silicon-silicon carbide based composite material, silicon carbide-cordierite based composite material, silicon nitride, lithium aluminum silicate, aluminum titanate, and Fe—Cr—Al-based metal or a combination of two or more of the materials.

Next, a method for manufacturing a ceramic honeycomb structure of the present invention will be described. In the present invention, the cell structure 2 can be obtained by obtaining a honeycomb-shaped formed article by the use of kneaded clay of predetermined raw materials by extrusion forming or the like, followed by drying and firing. There is no particular limitation on the outer shape, dimensions, cell shape, cell density, partition wall thickness, etc., and they may suitably be selected according to the application and use environment.

Figure 12:
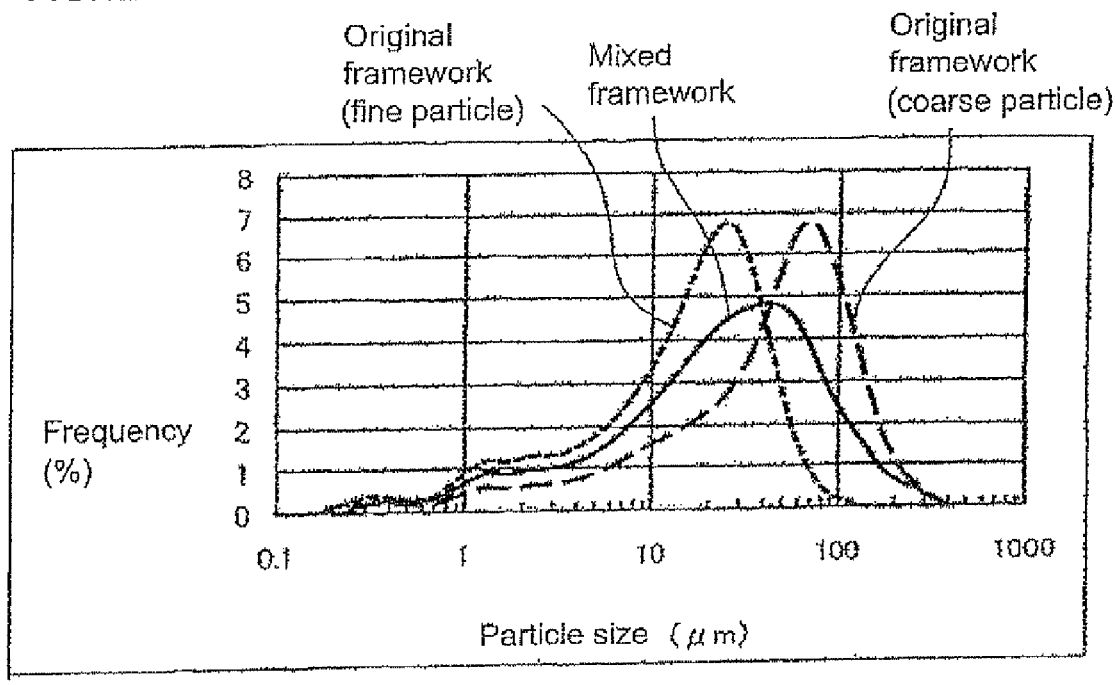
FIG. 12 is a graph where particle size distributions of the fine aggregate, coarse aggregate, and mixed aggregate of Example 6 are plotted.

In order to obtain a honeycomb structure 1 shown in FIG. 12, in the first place, kneaded clay is obtained from a forming raw material. Next, the kneaded clay is formed to obtain a cell structure 2 as a monolithic formed article having partition walls forming a plurality of cells separated into a honeycomb shape. Though the forming method is not particularly limited, extrusion forming is generally preferable, and it is preferable to use a plunger extruder, a biaxial screw type continuous extruder, or the like.

Alternatively, for example, honeycomb segments 22 as shown in FIG. 2A are formed. The honeycomb segments 22 are unitarily bonded together by means of a bonding layer 18 to obtain a cell structure 12. Incidentally, the bonding material used for formation of the bonding layer 18 contains inorganic particles and an inorganic adhesive as the main components and an organic binder, a surfactant, resin balloons, and water as accessory components.

Then, a part of the outer periphery of the cell structure 2 formed as a monolithic type or the cell structure 12 obtained by unitarily bonding the honeycomb segments 22 is removed. As a method for processing the outer peripheral portion of the cell structure 2 or 12 into the predetermined shape, grinding processing is general. However, other processing methods may be employed.

Then, by applying the aforementioned coating material containing at least a ceramic powder aggregate and water on the face exposing outside in the periphery of the partition walls locating in the outermost periphery, followed by drying and firing to manufacture honeycomb structure 1 or 10 where the outer periphery is covered with the coating material.

Incidentally, the honeycomb structure 1 or 10 may have plugged portions disposed in such a manner that one of the end portions of each cell is alternately plugged in the two end faces.

Figure 2C:
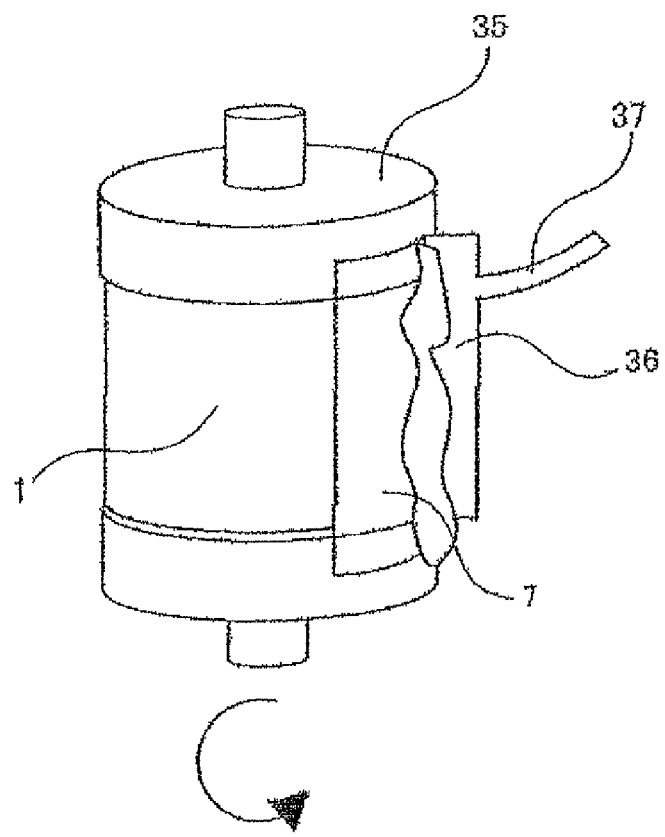
FIG. 2C is a schematic view showing an example of a coating system of a honeycomb structure.

FIG. 2C shows an example of a method for applying a coating material on the outer periphery of a ceramic honeycomb structure. The honeycomb structure 1 is fixed by a rotatable holding jig 35 and rotates with the holding jig 35. The coating material supplied from the coating material supply path 37 is applied on the outer periphery of the rotating honeycomb structure 1 with a flat nozzle 36. With the coating material 7 being discharged, flattening and smoothening are performed with a blade attached to the flat nozzle 36. After the flattening and smoothening, the honeycomb structure is taken out to be subjected to heat-drying under predetermined conditions, for example, at 100° C. for one hour. After drying, a burr on the outer peripheral face is removed as necessary, and the outer peripheral face is amended to obtain a honeycomb structure.

EXAMPLE

Hereinbelow, the present invention will be described in more detail on the basis of Examples. However, the present invention is by no means limited to these Examples.

(Coating Material Preparation Step: Preparation of Coating Material)

A coating material was prepared by the use of a powder of potsherd, ceramic fibers, an inorganic additive, and an organic additive as powder aggregates; water as a dispersion medium and colloidal silica as a bonding material. Incidentally, in order to fix the applicability of the coating material, 0 to 4% of water was further added to adjust the viscosity to be desired (e.g., 220±30 dPa·s), and total amount including additive water was made to be about 100%. The blend ratio of the coating material is shown in Table 1. The method for adjusting the aggregates used in Comparative Examples and Examples is described below.

TABLE 1

| Component | Proportion (%) |
| --- | --- |
| Powder of potsherd | 60 |
| Dispersant | 0.6 |
| Organic binder | 0.1 |
| Water | 21.3 |
| Colloidal silica | 18 |
| Total | 100 |

(Coating Material Preparation Step: Adjustment of Powder Aggregates)

In order to obtain the desired average particle size and particle size distribution, the blend ratio was suitably changed for adjustment, and the fine particle aggregate, coarse particle aggregate, and powder aggregate of each of Comparative Examples and Examples as shown in Table 2 were obtained. The measurement of the particle size distribution was based on a "wet process", a laser diffraction/scattering type particle size distribution measurement apparatus (model number: LA-920, produced by HORIBA, Ltd.) was used as the measurement apparatus, and the resolution performance of the horizontal axis was measured by dividing 0.02 to 2000 μm into 85 by a logarithmic scale as setup conditions. As the other measurement conditions, the ultrasonic dispersion time was one minute, and the amount of each aggregate to be measured was 0.05 g.

TABLE 2

| Coating material | Original aggregate (fine particle aggregate) | | Original aggregate (coarse particle aggregate) | | Average particle size of powder aggregate (μm) | Particle size distribution width of powder aggregate | Number of crack(s) |
| --- | --- | --- | --- | --- | --- | --- | --- |
| | Average particle size (μm) | Particle size distribution width | Average particle size (μm) | Particle size distribution width | | | |
| Comp. Ex. 1 | 16.0 | 5.2 | — | — | 16.0 | 5.2 | 142 |
| Comp. Ex. 2 | 16.4 | 9.4 | — | — | 16.4 | 9.4 | 116 |
| Comp. Ex. 3 | 18.8 | 6.8 | — | — | 18.8 | 6.8 | 98 |
| Comp. Ex. 4 | — | — | 21.7 | 10.7 | 21.7 | 10.7 | 60 |
| Comp. Ex. 5 | — | — | 24.3 | 13.1 | 24.3 | 13.1 | 30 |
| Comp. Ex. 6 | — | — | 31.6 | 9.6 | 31.6 | 9.6 | 47 |
| Comp. Ex. 7 | — | — | 42.6 | 11.6 | 42.6 | 11.6 | 18 |
| Comp. Ex. 8 | 16.0 | 5.2 | 34.9 | 9.5 | 22.0 | 12.3 | 40 |
| Comp. Ex. 9 | 14.0 | 4.5 | 30.5 | 8.3 | 19.2 | 10.7 | 80 |
| Comp. Ex. 10 | 6.7 | 2.2 | 39.6 | 10.9 | 16.0 | × (2 peaks) | 73 |

TABLE 2-continued

| Coating material | Original aggregate (fine particle aggregate) | | Original aggregate (coarse particle aggregate) | | Average particle size of powder aggregate (μm) | Particle size distribution width of powder aggregate | Number of crack(s) |
|---|---|---|---|---|---|---|---|
| | Average particle size (μm) | Particle size distribution width | Average particle size (μm) | Particle size distribution width | | | |
| Example 1 | 16.0 | 5.2 | 39.6 | 10.9 | 22.6 | 14.7 | 0 |
| Example 2 | 16.4 | 9.4 | 39.6 | 10.9 | 22.6 | 15.8 | 0 |
| Example 3 | 16.0 | 5.2 | 42.6 | 11.6 | 23.2 | 16.3 | 0 |
| Example 4 | 16.0 | 5.2 | 39.6 | 10.9 | 24.4 | 14.6 | 0 |
| Example 5 | 20.1 | 10.7 | 39.6 | 10.9 | 27.3 | 16.7 | 0 |
| Example 6 | 16.0 | 5.2 | 47.0 | 13.2 | 24.6 | 18.9 | 0 |
| Example 7 | — | — | 38.8 | 32.8 | 38.8 | 32.8 | 0 |
| Example 8 | — | — | 30.7 | 19.6 | 30.7 | 19.6 | 0 |

In Comparative Examples 1 to 7, the fine particle aggregate and the coarse particle aggregate were manufactured by the use of a mass production pulverizer. In Comparative Examples 8 to 10, the fine particle aggregate and the coarse particle aggregate were manufactured by the use of a mass production pulverizer, and then, in each of the Comparative Examples, dry mixing was performed at a ratio of fine particle aggregate:coarse particle aggregate=4:6 with a kneader to obtain a mixed aggregate. In Examples 1 to 6, the fine particle aggregate and the coarse particle aggregate were manufactured by the use of a mass production pulverizer, and then, the blend ratio was suitably changed to obtain desired particle size and particle size distribution for adjustment, followed by dry mixing with a kneader to obtain a mixed aggregate. In Examples 7 and 8, a horizontal swirling flow type jet mill was used to obtain a powder aggregate. In each of Examples 1 and 4 to 6, the fine particle aggregate and the coarse particle aggregate were mixed together at the blend ratio (mass ratio) of 4:6 to obtain a mixed aggregate. In each of Examples 2 and 3, the fine particle aggregate and the coarse particle aggregate were mixed together at the blend ratio (mass ratio) of 3:7 to obtain a mixed aggregate.

Figure 5A:
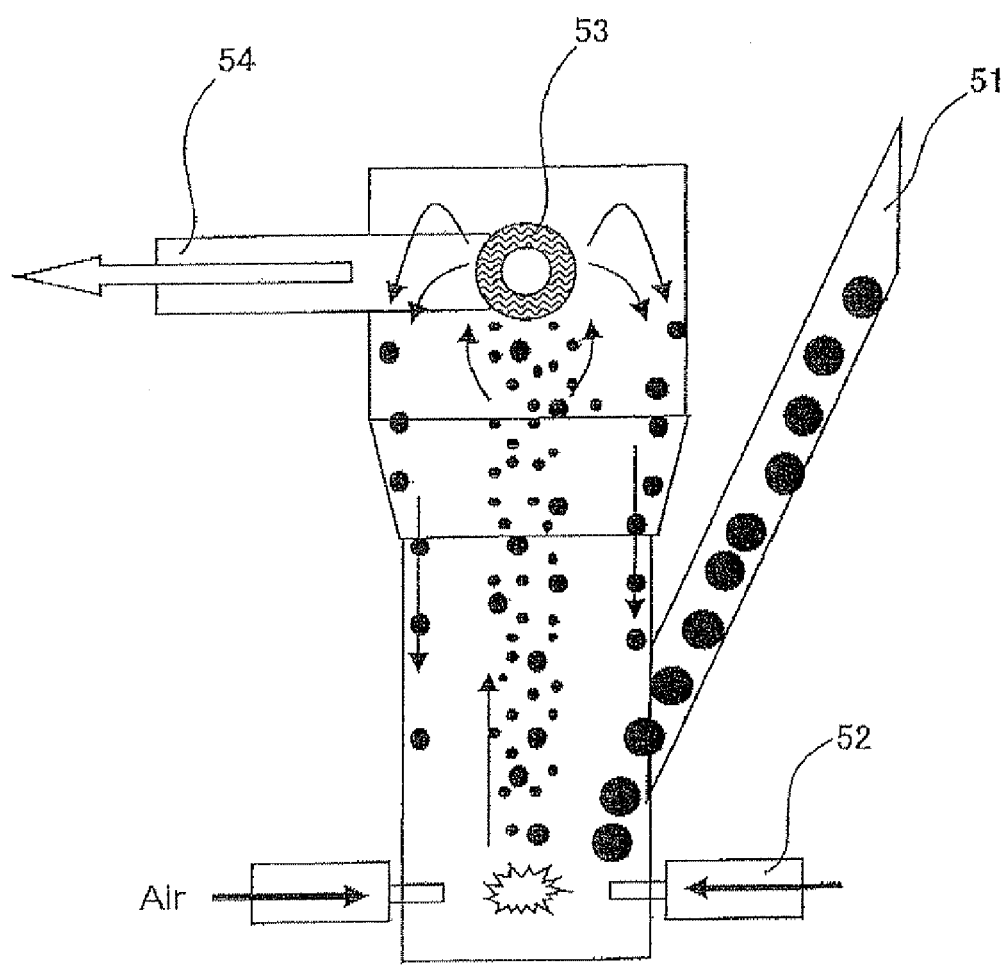
FIG. 5A is a schematic view of an example of a counter type jet mill.

The fine particle aggregate and the coarse particle aggregate used in Examples 1 to 6 and Comparative Examples 1 to 10 were obtained by pulverizing a raw material powder before pulverization with a counter type jet mill 50 provided with a classifier as shown in FIG. 5A. The pulverizing was performed in the following manner by the use of the counter type jet mill 50 (model number: 400AFG, produced by Hosokawa Micron Corporation). The raw material powder before pulverization is put in the mill from the raw material powder supply port 51 and injected from the pulverization nozzle 52 inside the counter type jet mill 50. Inside the counter type jet mill 50, pulverization is performed by a head-on collision of powders to each other. The powders pass through the classification rotor 53 in the upper portion and are discharged from the powder discharge port 54. The coarse particles which cannot pass through the classification rotor 53 fall into the lower portion and are subjected to pulverization again. Since the counter type jet mill 50 is provided with classifier, the particle size can be adjusted. However, the particle size distribution becomes sharp. Thus, even the jet mill itself is required to uniformalize the particle size. Therefore, it is difficult to manufacture a powder aggregate satisfying the condition of the particle size distribution width required by the coating material of the present invention in a single procedure by the use of the jet mill of this system, and adjustment is necessary by mixing powders having different particle size distributions.

Figure 11:
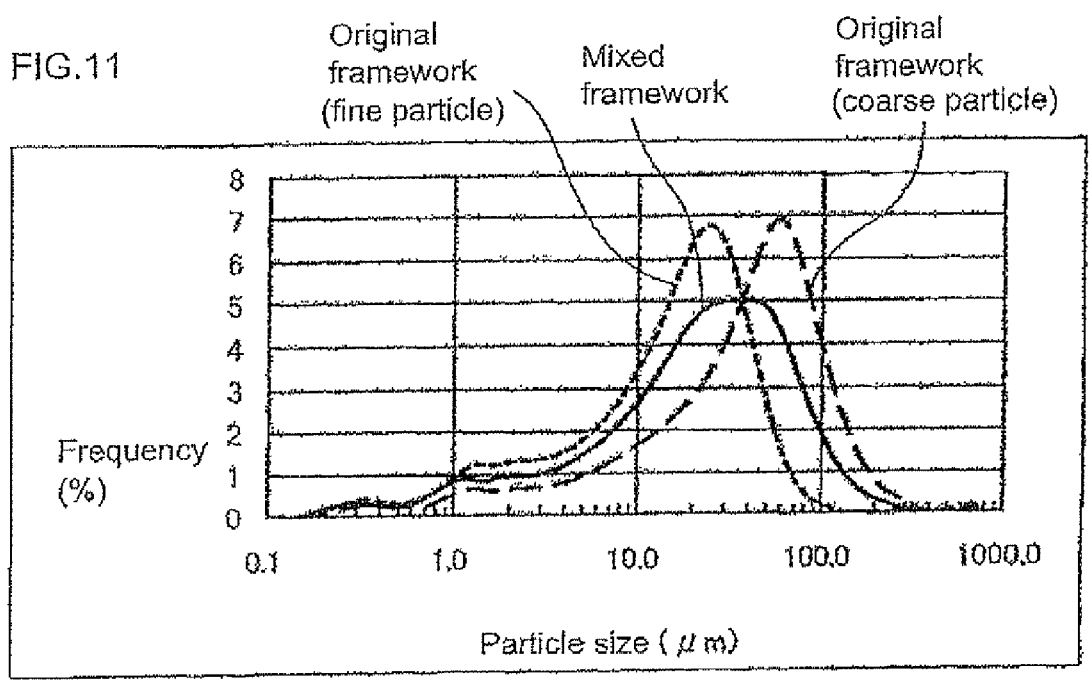
FIG. 11 is a graph where particle size distributions of the fine aggregate, coarse aggregate, and mixed aggregate of Example 1 are plotted.
Figure 13:
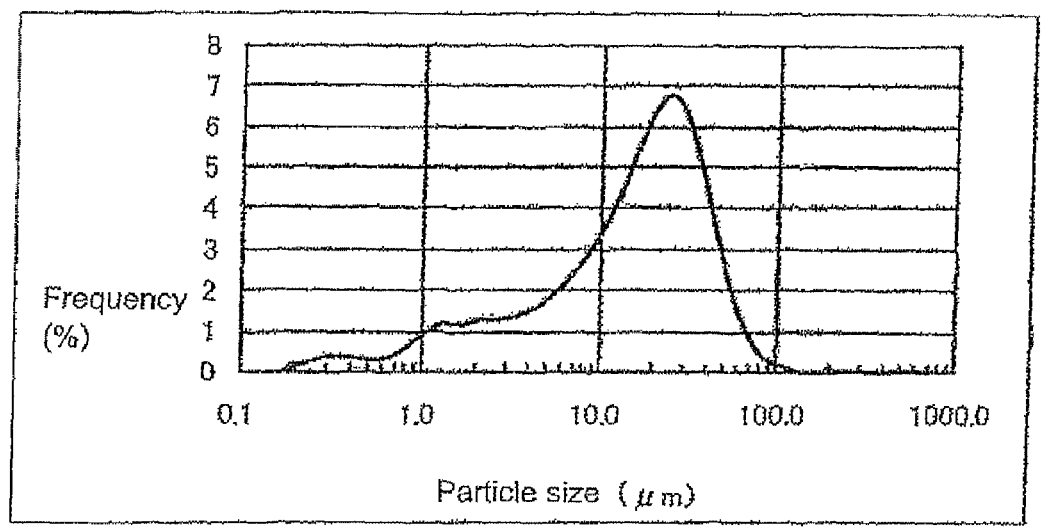
FIG. 13 is a graph where a particle size distribution of a powder aggregate of Comparative Example 1 is platted.
Figure 14:
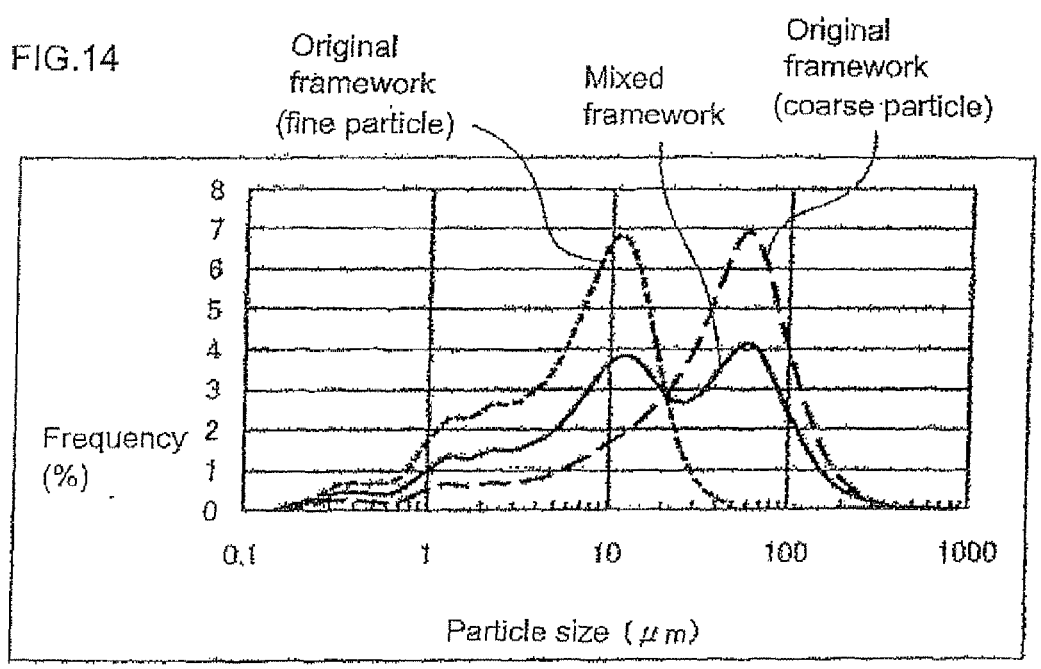
FIG. 14 is a graph where particle size distributions of the mixed aggregate, fine aggregate, and coarse aggregate of Comparative Example 10 are plotted.

As representative examples of Examples relating to particle size distribution, each of FIGS. 11 and 12 shows a graph where particle distributions of the fine particle aggregate, the coarse particle aggregate, and the mixed aggregates obtained by mixing the fine particle aggregate and the coarse particle aggregate of each of Example 1 and Example 6 are plotted. In addition, as a representative example of Comparative Examples, FIG. 13 shows a graph where the particle size distribution of Comparative Example 1 is plotted. In addition, FIG. 14 shows a graph where particle size distributions of the fine particle aggregate, the coarse particle aggregate, and the mixed aggregate obtained by mixing the fine particle aggregate and the coarse particle aggregate and having two peaks of Comparative Example 10 are plotted. Incidentally, in each of the graphs of particle size distributions shown in FIGS. 11 to 14, the frequency (%) is shown only in the range of 0.1 to 1000 μm because it is 0% in the range other than the range of 0.1 to 1000 μm.

Figure 5B:
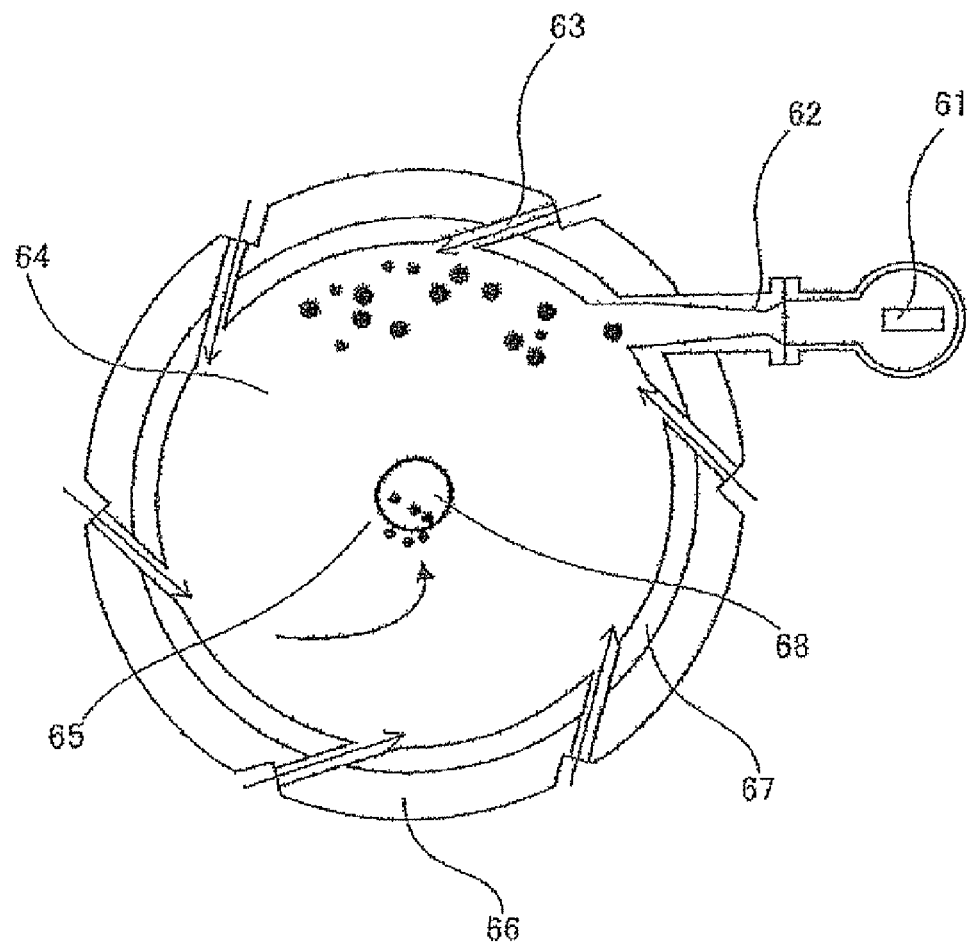
FIG. 5B is a schematic view of an example of a horizontal swirling flow type jet mill.

The powder aggregate in each of Examples 7 and 8 was obtained by the use of a horizontal swirling flow type jet mill 60 (model number: PJM-200SP, produced by Nippon Pneumatic Mfg. Co., Ltd) as shown in FIG. 5B. The structure and the function of the mill will be lined out below. The horizontal swirling flow type jet mill 60 has a pulverization zone 64 covered with a ceramic liner 67 in the mill frame 66 as shown in FIG. 5B. The raw material powder before pulverization is injected from a Venturi nozzle 62 to the pulverization zone 64 via a pusher nozzle 61. In the pulverization zone 64, a grinding nozzle 63 is horizontally disposed point-symmetrically. The raw material powder before pulverization injected into the pulverization zone 64 is involved in a high speed airflow from the grinding nozzle 63 and pulverized by collision of the raw material powders before pulverization to each other. Through the classification zone 65 in the vicinity of the center, the fine particle aggregate pulverized and having a uniform particle size and a sharp particle size distribution can be obtained from the outlet 68.

In Examples 7 and 8, the amount of the raw material powder before pulverization to be put in the mill was made to be 80 kg/hr, which is 4 times 20 kg/hr, which is for obtaining a fine particle aggregate having a uniform particle size and a sharp particle size distribution. In addition, in Examples 7 and 8, the pulverization time was 3 minutes, which is 0.3 times 10 minutes of general pulverization time. Without using the fine particle aggregate obtained from the outlet 68 and having a uniform particle size and a sharp particle size distribution, a powder aggregate collected in the pulverization zone 64 and having abroad particle size distribution was used as the powder aggregate for the coating material.

(Coating Material Application Step: Coating Material Heat-Drying Step

Figure 4A:
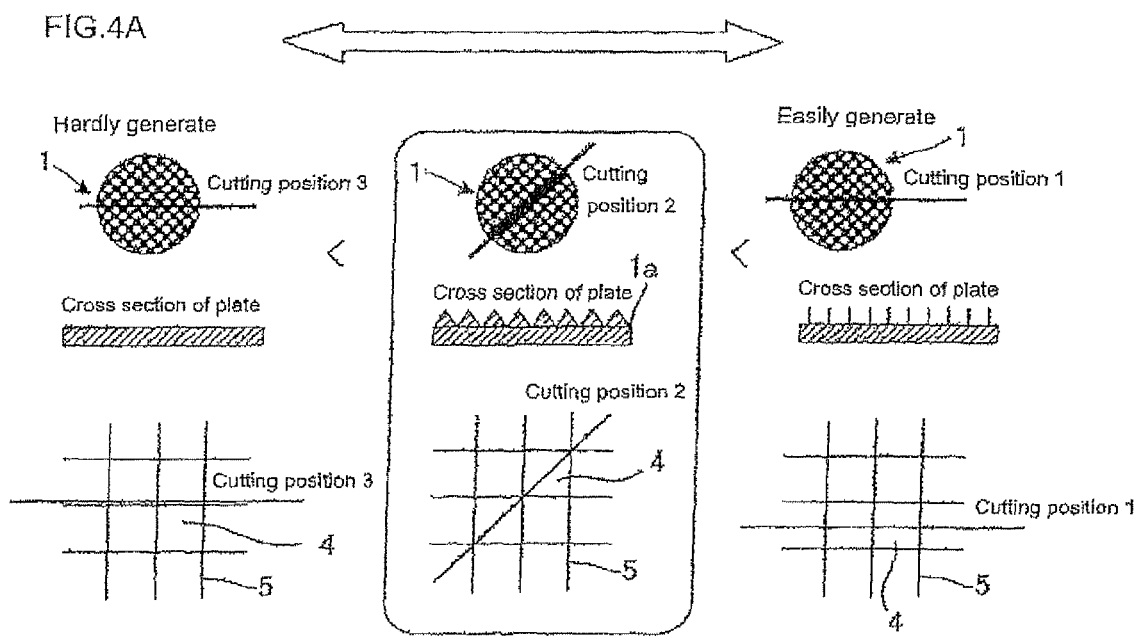
FIG. 4A is a view for explaining a method for cutting a sample.

The coating material application step of the present invention is a step where a coating material is applied on a honeycomb structure having a plurality of cells separated by ceramic porous partition walls in such a matter that the outer periphery is covered with the coating material. In order to make the surface conditions severe and the observation easy, in the coating material application step and the coating material heat-drying step, application and drying were performed to a test piece which is a plate-shaped article shown below. As shown in FIG. 4A, there was used a plate-shaped article 1a (square of 250 mm×250 mm) obtained by cutting a cordierite ceramic honeycomb structure 1 having a porosity of 48% in the direction of 45° with respect to the cells 4 for the test. This is because a test with actually forming the outer wall takes time. Even with a plate-shaped article 1a, a similar result as in the case of application on the outer wall can be obtained. There was used for the test the plate-shaped article 1a obtained by cutting the honeycomb structure 1 along the direction of 45° with respect to the partition walls 5 of the cells 4 shown by the cutting position 2 of FIG. 4A. The reason why it was cut in the oblique direction with respect to the partition walls 5 is that the test is performed under the conditions where a crack is caused easily (condition of large unevenness on the application face). However, since it is difficult to make the height uniform upon manufacturing the plate-shaped article 1a because the unevenness itself is brittle under the conditions where a crack is caused most easily (cutting position 1), a plate-shaped article cut obliquely with respect to the partition walls 5 (cutting position 2) was used for the test. (Incidentally, in the cutting position 3, a crack is hardly caused).

As shown in FIG. 4B, a plate-shaped article 1a was cut out from the honeycomb structure 1, and a coating material 7 (Examples 1 to 8, Comparative Example 1 to 10) was applied on the plate-shaped article 1a into a predetermined shape by the use of a predetermined mold 32 by moving a squeegee 33 thereon, followed by drying at 100° C. for one hour to harden the applied coating material 7. In the heat-drying, a natural convection type drier was used.

(Crack Observation)

Figure 6:
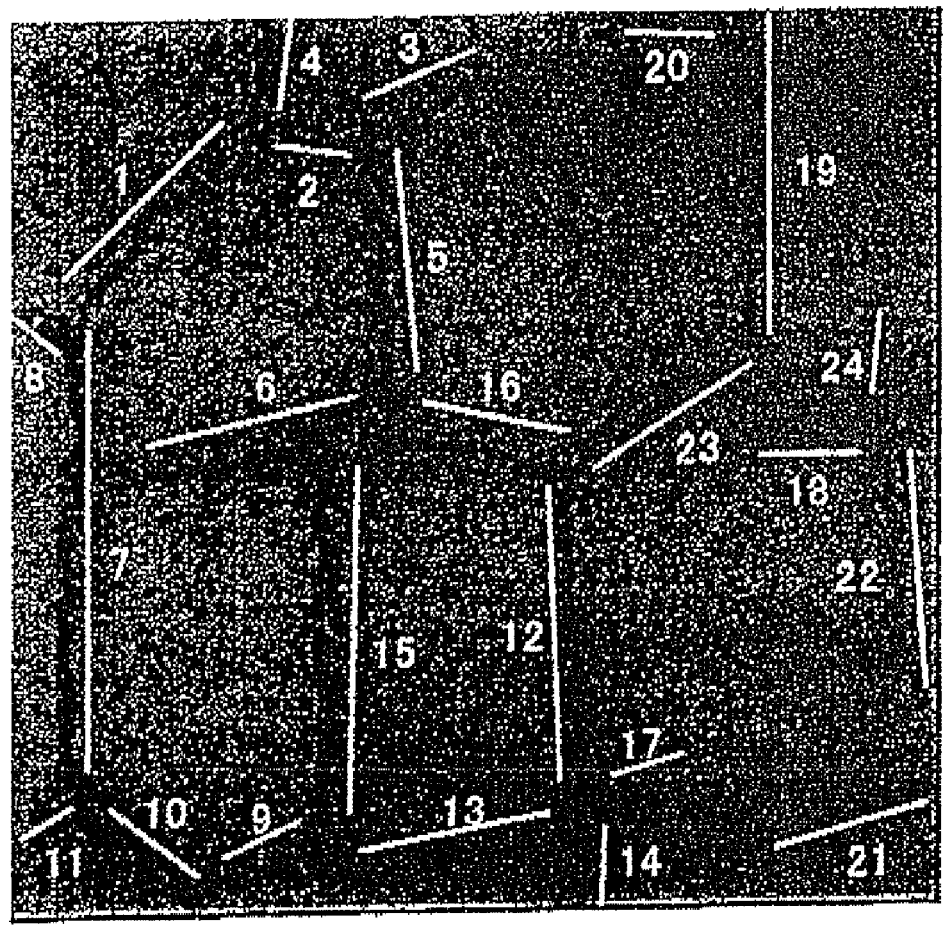
FIG. 6 is a photograph for explaining crack observation.

Generation of a visually observable crack was confirmed with regard to the coating material 7 obtained in the coating material application step and the coating material heat-drying step, and, as shown in FIG. 6, the number of cracks was counted and evaluated with regarding the crack from a branching point to another branching point as one crack.

Figure 7:
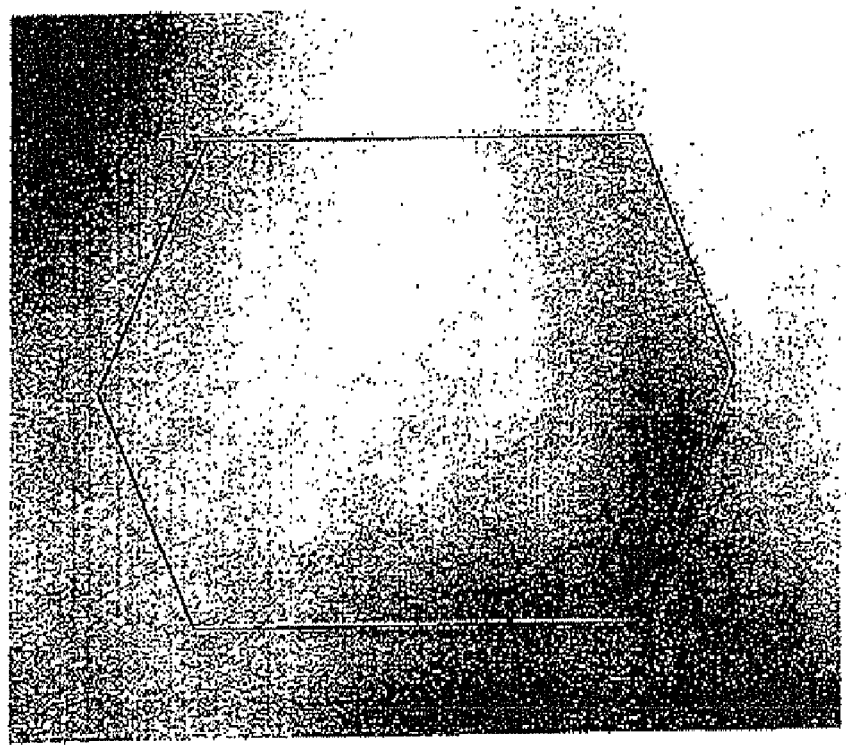
FIG. 7 is a photograph of a surface of a coating material, showing a test result of Example.
Figure 8:
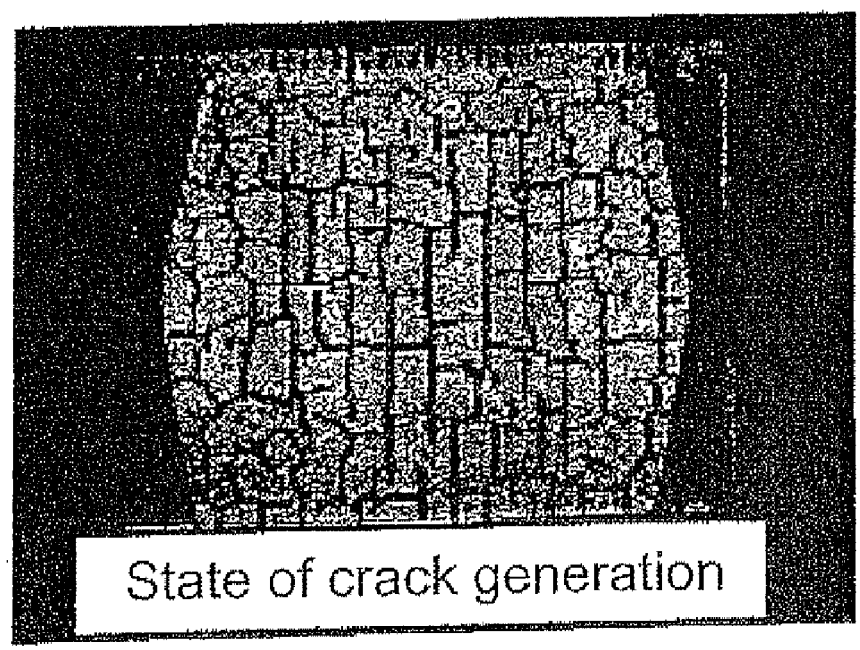
FIG. 8 is a photograph of a surface of a coating material, showing a test result of Comparative Example.

Further, regarding Example 6 among the articles having no crack in the coating material 7 applied on the plate-shaped article 1a, the coating material 7 was applied on the outer periphery of the ceramic honeycomb structure to reconfirm crack generation. That is, after the coating material was applied so as to cover the outer periphery of the ceramic honeycomb structure by using a predetermined outer peripheral coater, the applied coating material was hardened by drying at 100° C. for one hour to manufacture a ceramic honeycomb structure having an outer diameter of 267 mm, a height of 203 mm, and a coat thickness of 1 mm. It was confirmed by eye observation that no crack was generated in the outer wall. Here, in order to quantify the particle size distribution of the aggregate, the particle size distribution width was defined as "Particle size distribution width=half-value width of particle size curve/peak height" as mentioned above. The results are shown in Table 2. FIG. 7 shows a surface photograph of a coating material (portion surrounded by the hexagon), showing a test result of Example. FIG. 8 showing a test result of Comparative Example.

As shown in Table 2, by forming the outer wall of a honeycomb structure by the use of a ceramic powder aggregate shown in Examples, crack generation in the outer wall can be reduced or prevented (Examples 1 to 8). In the cases that ceramic powder aggregates were constituted of only a fine particle aggregate (Comparative Example 1 to 3) or only a coarse particle aggregate (Comparative Example 4 to 7), a crack was generated. Even in the ceramic powder aggregate obtained by mixing a fine particle aggregate and a coarse particle aggregate, a crack was caused depending on the constitution of the average particle size and the particle size distribution width (Comparative Example 8 to 10). In Comparative Example 10, as shown in a graph of a particle size distribution curve of FIG. 14, two peaks were generated in the particle size distribution curve by the use of a ceramic powder aggregate obtained by mixing a fine particle aggregate and a coarse particle aggregate, and a crack was generated in this case, too.

Since Comparative Examples 1 to 3 are constituted of only a fine particle aggregate and tends to have high viscosity of a coating material, liquid components such as water is blended in large amounts. Therefore, since a water content difference (contraction difference) is easily caused in the coating material, a crack is easily generated upon drying.

Since Comparative Examples 4 to 7 are constituted of only a coarse particle aggregate, a coating material dry article becomes relatively porous. Therefore, since a water content difference (contraction difference) is easily caused in the coating material, a crack is easily generated upon drying.

Though each of Comparative Examples 8 to 10 employs a powder aggregate obtained by mixing a fine particle aggregate and a coarse particle aggregate, it has a small particle size distribution width (sharp particle size curve) of the powder aggregate or two peaks. Therefore, since a water content difference (contraction difference) is easily caused in the coating material, a crack is easily generated upon drying.

In each of the Examples, since there is used a mixed aggregate having an adjusted particle size by mixing a fine particle aggregate and a coarse particle aggregate with only one peak in the particle size distribution and a suitably broad particle size distribution width, a coating material dry article is relatively dense (nearly densest filling). Therefore, a water content difference (contraction difference) is hardly caused in the coating material, and strength of the coating material dried article is increased. In addition, a crack is hardly caused upon drying.

Figure 9:
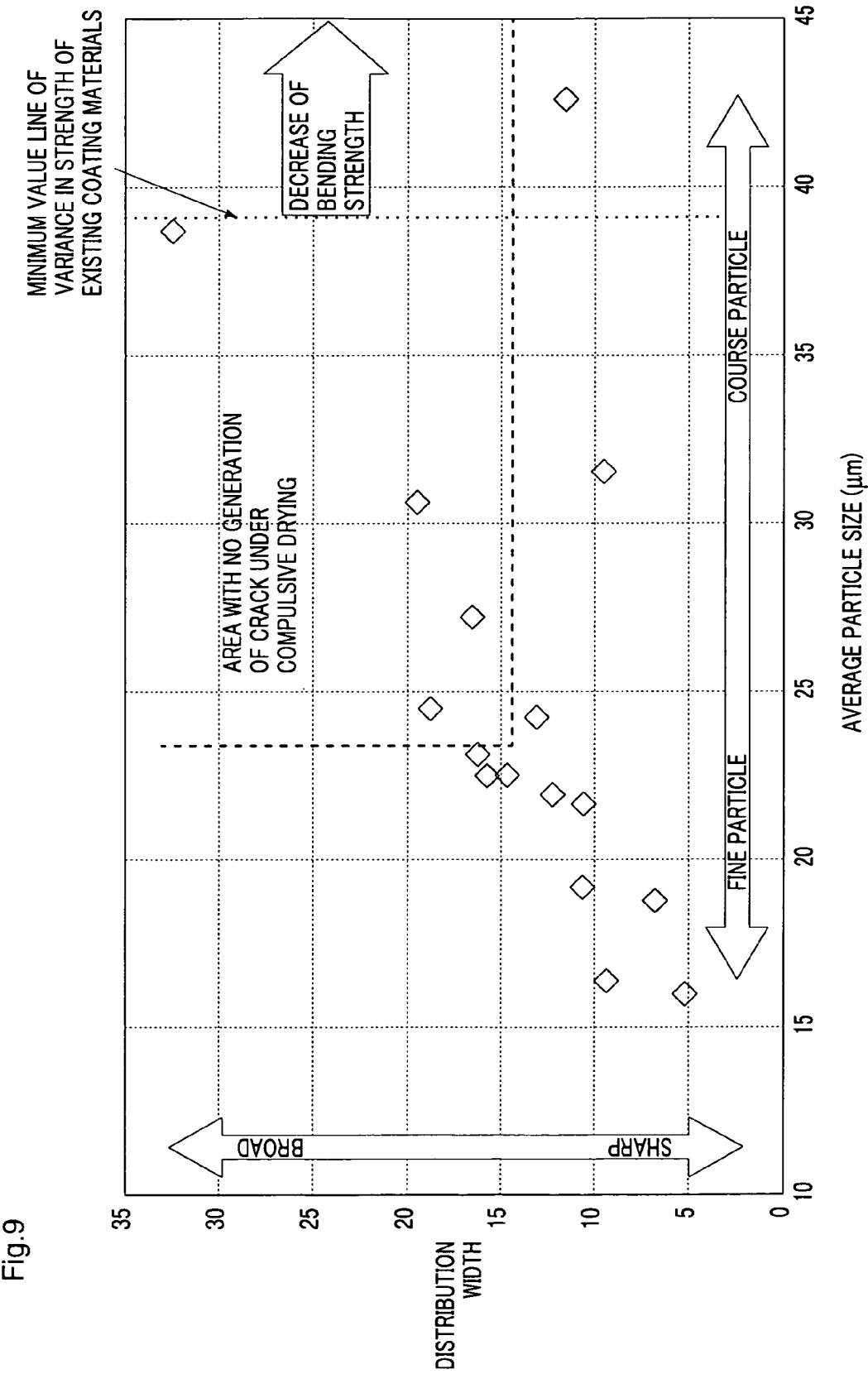
FIG. 9 is a graph showing the average particle size and the particle size distribution width of the powder aggregate.

The range shown in Examples 1 to 8 is a limited range where particle sizes and the particle size distribution are set to generate no crack under compulsive drying as shown in FIG. 9 (upper right area of dashed-line), which is obtained by mixing a coarse particle aggregate and a fine particle aggregate. As the particle become coarser, the dry strength (bending strength) of the coating material is reduced. Therefore, the particle size giving the lowest value of variance in strength of a conventional coating material was determined as the upper limit (pecked line in FIG. 9) of the particle size of the coarse particle aggregate. The target particle size and the target range of particle size distribution of the aggregate were determined from the range of the particle size where a crack is not generated, the upper limit of the particle size, and the limit line of the particle size which is assumed to be able to manufacture by mixing fine and coarse particle aggregates.

The present invention can suitably be used as a method for manufacturing a ceramic honeycomb structure used for a filter, a catalyst carrier, or the like.

What is claimed is:

1. A method for manufacturing a ceramic honeycomb structure having a plurality of cells separated by porous ceramic partition walls, the honeycomb structure being covered by a coating material, and the method comprising:

a coating material adjustment step for obtaining a coating material by mixing at least water with a ceramic powder aggregate having only one peak in a particle size distribution curve, an average particle size of 23 to 39 μm, and a particle size distribution width of 15 to 33 in the case that the particle size distribution width of a powder is defined as a value obtained by dividing half-value width of peak height in a particle size distribution curve obtained by plotting particle size-based frequency by the peak height;

a coating material application step for applying the coating material to cover the outer periphery of a honeycomb structure having a plurality of cells separated by porous ceramic partition walls; and a coating material heat-drying step for forming an outer wall by heat-drying the coating material after the coating material application step.

* * * * *